(12) United States Patent
Kim et al.

(10) Patent No.: US 8,121,549 B2
(45) Date of Patent: *Feb. 21, 2012

(54) METHOD AND SYSTEM FOR ALLOCATING RESOURCE IN A COMMUNICATION SYSTEM

(75) Inventors: Yong-Seok Kim, Suwon-si (KR);
Soon-Young Yoon, Seoul (KR);
Sung-Soo Hwang, Suwon-si (KR);
Ki-Young Han, Yongin-si (KR); June Moon, Seoul (KR); Joo-Hyun Lee, Suwon-si (KR); Keun-Chul Hwang, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 1449 days.

This patent is subject to a terminal disclaimer.

(21) Appl. No.: 11/649,718

(22) Filed: Jan. 4, 2007

(65) Prior Publication Data
US 2007/0173198 A1 Jul. 26, 2007

(30) Foreign Application Priority Data

Jan. 4, 2006 (KR) .................. 10-2006-0001115

(51) Int. Cl.
*H04B 1/00* (2006.01)
*H04B 15/00* (2006.01)
(52) U.S. Cl. ....... 455/63.1; 455/422; 455/446; 370/208; 370/480

(58) Field of Classification Search ................. 455/63.1, 455/446, 447, 456.1, 442, 509; 370/208, 370/480
See application file for complete search history.

(56) References Cited

U.S. PATENT DOCUMENTS

| | | | | |
|---|---|---|---|---|
| 5,475,734 A * | 12/1995 | McDonald et al. | ............ | 455/561 |
| 6,993,339 B2 * | 1/2006 | Skillermark et al. | .......... | 455/447 |
| 7,392,054 B2 * | 6/2008 | Cho et al. | ....................... | 455/447 |
| 2002/0110101 A1 * | 8/2002 | Gopalakrishnan et al. | ... | 370/335 |
| 2004/0166902 A1 * | 8/2004 | Castellano et al. | ......... | 455/562.1 |
| 2005/0153703 A1 * | 7/2005 | Juntti et al. | ................. | 455/452.2 |
| 2005/0197129 A1 | 9/2005 | Cho et al. | | |
| 2005/0281226 A1 | 12/2005 | Lee et al. | | |
| 2005/0282550 A1 | 12/2005 | Cho et al. | | |
| 2007/0127359 A1 | 6/2007 | Ahn et al. | | |

FOREIGN PATENT DOCUMENTS

| | | |
|---|---|---|
| EP | 1 261 228 | 11/2002 |
| EP | 1 575 326 | 9/2005 |
| KR | 1020050048261 | 5/2005 |
| KR | 1020050089711 | 9/2005 |
| KR | 1020050114589 | 12/2005 |
| WO | WO 03/017696 | 2/2003 |
| WO | WO 2004/095851 | 11/2004 |

* cited by examiner

*Primary Examiner* — Tuan H Nguyen
(74) *Attorney, Agent, or Firm* — The Farrell Law Firm, P.C.

(57) ABSTRACT

A method for allocating resource in a communication system. The resource allocation method includes dividing a data transmission region into a first region and a second region; allocating resource of the first region when a first Mobile Station (MS) among MSs is an MS located in a non-interference region; and allocating resource of the second region when a second MS among the MSs is an MS located in an interference region.

21 Claims, 6 Drawing Sheets

METHOD AND SYSTEM FOR ALLOCATING RESOURCE IN A COMMUNICATION SYSTEM

PRIORITY

This application claims the benefit under 35 U.S.C. §119(a) of a Korean Patent Application filed in the Korean Intellectual Property Office on Jan. 4, 2006 and assigned Serial No. 2006-1115, the disclosure of which is incorporated herein by reference.

BACKGROUND OF THE INVENTION

1. Field of the Invention

The present invention relates generally to a communication system, and in particular, to a resource allocation method and system for removing cell interference between neighbor cells in a communication system having a multi-cell structure.

2. Description of the Related Art

In the next generation communication system, active research is being conducted to provide high-speed services having various Qualities of Service (QoS) to users. Particularly, in the next generation communication system, a study is being conducted to support high-speed services that can guarantee mobility and QoS for a Broadband Wireless Access (BWA) communication system such as a Wireless Local Area Network (WLAN) system and a Wireless Metropolitan Area Network (WMAN) system. An Institute of Electrical and Electronics Engineers (IEEE) 802.16a/d communication system and an IEEE 802.16e communication system are typical BWA communication systems.

IEEE 802.16a/d communication systems and IEEE 802.16e communication systems, which are BWA communication systems, are communication systems employing Orthogonal Frequency Division Multiplexing (OFDM)/Orthogonal Frequency Division Multiple Access (OFDMA) to support a broadband transmission network for physical channels of the WMAN system. An IEEE 802.16a/d communication system currently considers only the state where a Subscriber Station (SS) is fixed, i.e. the state where mobility of the SS is never considered, and the single-cell structure. Unlike IEEE 802.16a/d communication systems, an IEEE 802.16e communication system considers mobility of a SS in the IEEE 802.16a communication system, and an SS having mobility will herein be referred to as a Mobile Station (MS).

In a BWA communication system, because limited resources, i.e. frequency resources, code resources, and time slot resources, are shared by a plurality of cells constituting the communication system, interference may occur between the plurality of cells, especially between neighbor cells. Interference between neighbor cells is considerable in a communication system using a frequency reuse factor of one. More specifically, the use of the frequency reuse factor of 1 can facilitate efficient utilization of frequency resources, but an MS located in a cell boundary between neighbor cells suffers a considerable decrease in a Carrier-to-Interference and Noise Ratio (CINR) of a signal received from a serving Base Station (BS) that manages the cell where the MS is located. That is, in a communication system using a frequency reuse factor of one, an MS located in the vicinity of the serving BS may have no difficulty in communicating with the serving BS due to low interference, but an MS located in a cell boundary suffers interference from a neighbor BS that manages a neighbor cell, thereby decreasing system performance.

Figure 1:
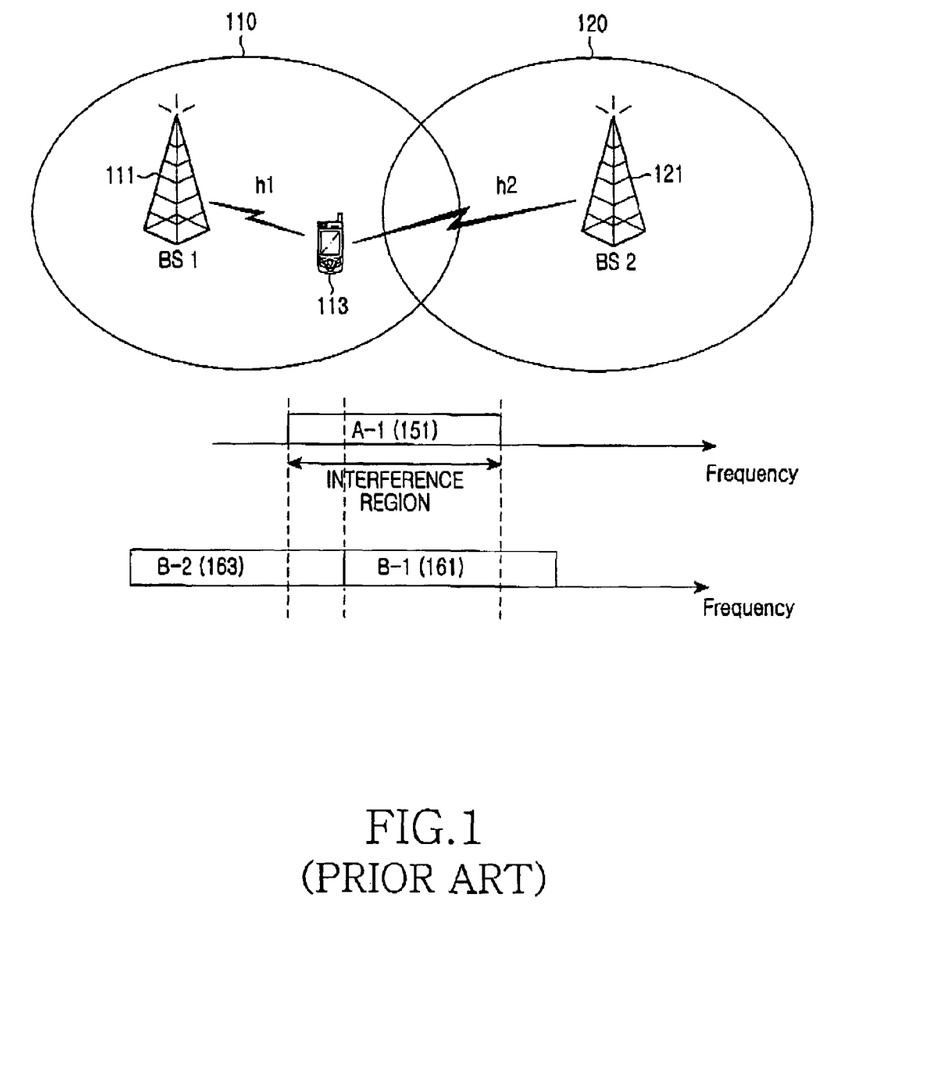
FIG. 1 is a diagram illustrating a configuration of a general BWA communication system.

In order to remove interference between neighbor cells, the MS improves a received CINR from a serving BS using an interference remover in a downlink interval, and the serving BS improves a received CINR from the MS using an interference remover in an uplink interval, thereby improving system performance. However, a scheme of improving system performance using an interference remover can hardly expect remarkable improvement of system performance, because the interference remover may not accurately remove interference signals or may not correctly restore signals received from the serving BS. With reference to FIG. 1, a description will now be made of a communication system having a multi-cell structure.

FIG. 1 shows a general BWA communication system according to the prior art. Referring to FIG. 1, the BWA communication system has a multi-cell structure, i.e. has a cell1 110 and a cell2 120, and includes a BS1 111 and a BS2 121 that manage the cells 110 and 120, respectively, and an MS 113 that is located in the cell1 110 and receives a communication service from the BS1 111. For convenience, signal exchanges between the BSs 111 and 121 and the MS 113 are assumed to be performed through a first channel h1 and a second channel h2, respectively, using OFDM/OFDMA.

The MS 113 is located in the boundary of the cell1 110, and the BS1 111 transmits data to the MS 113 located in the cell1 110 through a frequency region (A-1) 151. The BS2 121 that manages the cell2 120, which is a neighbor cell of the MS 113, transmits data to MSs located in the cell2 120 through a frequency region (B-1) 161 and a frequency region (B-2) 163. In this case, the MS 113 located in the boundary of the cell 1 110 can receive interference caused by data transmitted by the BS2 121, which is a neighbor BS, while receiving data from the BS1 111, which is the serving BS, through the frequency region (A-1) 151.

In other words, there is an overlapping region where the frequency region (A-1) 151 allocated to the MS 113 by the BS1 111 and the frequency region (B-1) 161 and the frequency region (B-2) 163 allocated to the MSs located in the cell2 120 by the BS2 121 overlap each other. The overlapping region is an interference region for the MS 113 located in the boundary of the cell1 110. Because of the presence of the interference region, if the BS2 121 of the cell2 120 transmits data through the frequency region (B-1) 161 and the frequency region (B-2) 163 using the same time-frequency resources as those of the BS1 111 while the MS 113 is receiving data from the BS1 111 through the frequency region (A-1) 151, the MS 113 located in the boundary of the cell1 110 decreases in the received CINR, causing a decrease in reception performance of the MS 113.

In order to prevent a decrease in the CINR due to interference of the cell2 120, the MS 113 removes interference using the interference remover as described above. However, because the BS1 111 and the BS2 121 allocate resources independently of each other, the interference remover may not accurately remove interference signals or may not correctly restore the signals received from the serving BS1 111. Therefore, it is hard to expect noticeable improvement of system performance.

More specifically, if the BS2 121 of the cell2 120 transmits data through the frequency region (B-1) 161 and the frequency region (B-2) 163 while the MS 113 is receiving data from the BS1 111, or a serving BS, through the frequency region (A-1) 151, the data transmitted by the BS2 121 serves as interference to the MS 113. In order to remove interference, the MS 113 should have information on the overlapping region between the frequency region (A-1) 151, and the frequency region (B-1) 161 and the frequency region (B-2) 163, i.e. information on the interference region. In addition, the MS 113 should have information on a Modulation and Coding Scheme (MCS) level of the data transmitted through the frequency region (B-1) 161 and an MCS level of the data transmitted through the frequency region (B-2) 163, and should also have information on the channel h2 of the cell2 120.

That is, in order to remove inter-cell interference of the cell2 120, the MS 113 should estimate the channel of the cell2 120 using a pilot received from the BS2 121. The need for the information by the MS 113 for the inter-cell interference removal acts as a heavy load to the MS 113, decreasing the system performance. When the MS 113 has a plurality of neighbor cells, the decrease in the system performance can be more considerable.

SUMMARY OF THE INVENTION

An aspect of the present invention is to address at least the problems and/or disadvantages and to provide at least the advantages described below. Accordingly, an aspect of the present invention is to provide a method and system for allocating resources in a communication system.

Another aspect of the present invention is to provide a method and system for allocating resources in a communication system having a multi-cell structure.

Further another aspect of the present invention is to provide a resource allocation method and system for removing inter-cell interference in a communication system having a multi-cell structure.

According to one aspect of the present invention, there is provided a method for allocating resource in a communication system. The resource allocation method includes dividing a data transmission region into a first region and a second region; allocating resource of the first region when a first MS among MSs is an MS located in a non-interference region; and allocating resource of the second region when a second MS among the MSs is an MS located in an interference region.

According to another aspect of the present invention, there is provided a method for allocating resource in a communication system. The resource allocation method includes analyzing information included in a MAP message region of the received frame upon receiving a frame from a BS; and determining a region where an MS itself is currently located in a serving cell according to the analyzed information, and determining a region where resource is allocated in the received frame according to the determined region where the MS itself is located.

According to further another aspect of the present invention, there is provided a system for allocating resource in a communication system. The resource allocation system includes a BS for dividing a data transmission region into a first region and a second region, allocating resource of the first region when a first MS among MSs is an MS located in a non-interference region, and allocating resource of the second region when a second MS among the MSs is an MS located in an interference region, and an MS for analyzing information included in a MAP message region of the received frame upon receiving a frame from the BS, determining a region where it is currently located in a serving cell according to the analyzed information, and determining a region where resource is allocated in the received frame according to the determined region where it is located.

BRIEF DESCRIPTION OF THE DRAWINGS

The above and other objects, features and advantages of the present invention will become more apparent from the following detailed description when taken in conjunction with the accompanying drawings in which.

Throughout the drawings, the same drawing reference numerals will be understood to refer to the same elements, features and structures.

DETAILED DESCRIPTION OF PREFERRED EMBODIMENTS

Preferred embodiments of the present invention will now be described in detail with reference to the annexed drawings. In the following description, a detailed description of known functions and configurations incorporated herein has been omitted for clarity and conciseness.

The present invention provides a method and system for allocating resources in, for example, an Institute of Electrical and Electronics Engineers (IEEE) 802.16 communication system, which is a Broadband Wireless Access (BWA) communication system. Although preferred embodiments of the present invention will be described herein with reference to an IEEE 802.16 communication system employing Orthogonal Frequency Division Multiplexing (OFDM)/Orthogonal Frequency Division Multiple Access (OFDMA), by way of example, the resource allocation method and system provided in the present invention can also be applied to other communication systems.

In addition, the present invention provides a resource allocation method and system for data transmission/reception between a transmitter, for example, a Base Station (BS) that manages each of a plurality of cells, and a receiver, for example, a Mobile Station (MS) that receives a communication service from the transmitter, in a communication system having a multi-cell structure. The BS allocates resources according to feedback information, for example, channel information, MS information, and the like, transmitted from the MS, and exchanges data with the MS through the allocated resources.

Preferred the present invention provide a resource allocation method and system for removing inter-cell interference in a communication system having a multi-cell structure. In the communication system, a BS divides resources for data transmission, i.e. a data transmission region, into a first region, for example, non-interference region, and a second region, for example, interference region. Thereafter, the BS allocates resources of the non-interference region, i.e. the first region, or resources of the interference region, i.e. the second region, to an MS according to feedback information transmitted from the MS.

In addition, preferred the present invention provide a frame structure with which an MS located in an arbitrary cell, e.g. a serving cell, among the plurality of cells can simply remove cell interference from a neighbor cell of the arbitrary cell while receiving a communication service from a serving BS that manages the arbitrary cell. That is, the BS divides a data transmission region of the frame into a non-interference region, i.e. the first region, and an interference region, i.e. the second region, and allocates resources of the interference region or resources of the non-interference region to an MS according to feedback information from the MS.

Meanwhile, an IEEE 802.16 communication system, which is a BWA communication system, according to the present invention has a frame structure, and the communication system allows a BS to efficiently allocate resources of each frame to MSs and transmit resource allocation information to the MSs through a MAP message. A MAP message used for transmitting downlink (DL) resource allocation information is referred to as a DL-MAP message, and a MAP message used for transmitting uplink (UL) resource allocation information is referred to as a UL-MAP message. If the BS transmits the downlink resource allocation information and the uplink resource allocation information through the DL-MAP message and the UL-MAP message in this manner, MSs can decode the DL-MAP message and the UL-MAP message transmitted by the BS, and detect allocation positions of the resources allocated to them, and control information of the data that the MSs should receive. The MSs can receive and transmit data through a downlink and an uplink by detecting the resource allocation positions and the control information.

Figure 2A:
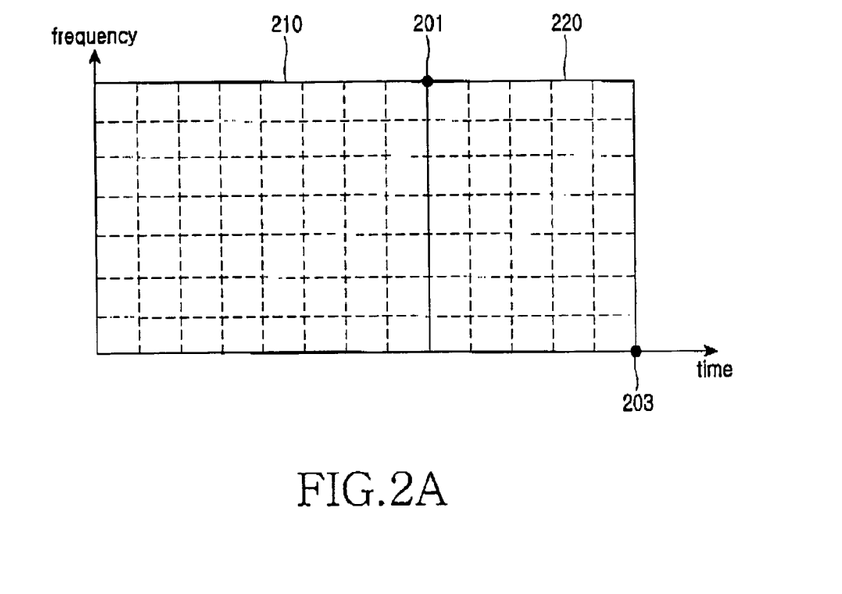
FIGS. 2A and 2B are diagrams illustrating frame structures in a communication system according to the present invention.
Figure 2B:
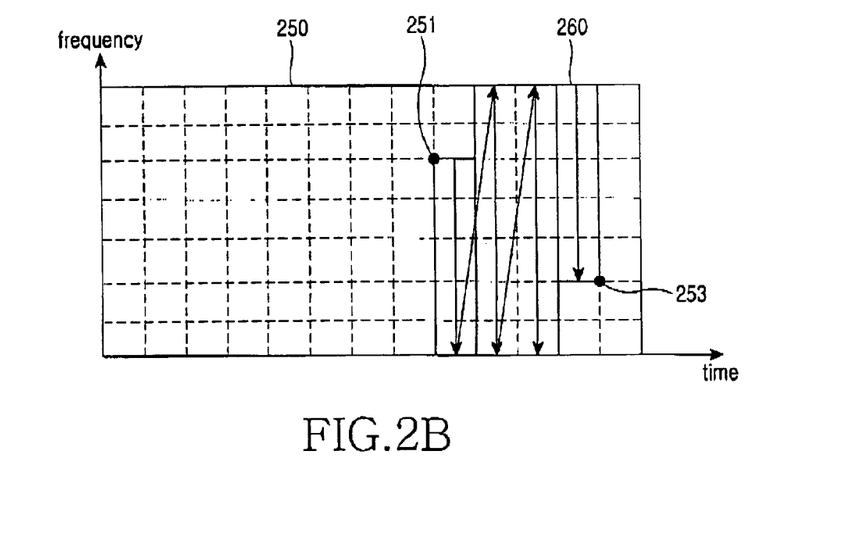

FIGS. 2A and 2B show frame structures in a communication system according to the present invention, a data transmission region of which is divided into a non-interference region, i.e. first region, and an interference region, i.e. second region. Specifically, FIG. 2A shows a frame structure that is divided into a non-interference region and an interference region in a rectangular form, and FIG. 2B show a frame structure that is divided into a non-interference region and an interference region according to a predetermined pattern.

Referring to FIGS. 2A and 2B, the frames for the communication system have a two-dimensional structure by a frequency region and a time region, and data transmission regions of the frames are divided into non-interference regions 210 and 250, and interference regions 220 and 260. If the communication system has a multi-cell structure, the interference regions 220 and 260 are divided as the same regions by BSs that manage the multiple cells. That is, the interference regions 220 and 260 of all frames of the multiple cells have the same sizes and positions.

More specifically, the interference regions 220 and 260 are defined by start positions 201 and 251 and end positions 203 and 253 of the regions of the frames, and in all frames for the multiple cells, the start positions 201 and 251 and the end positions 203 and 253 of the interference regions 220 and 260 are equal. In addition, the interference regions 220 and 260 are divided into specific unit regions for resource allocation to MSs located in an interference region of the cell, for example, to MSs which are located in the cell boundary and receive cell interference from a neighbor cell, and the specific unit region is allocated to one MS located in an interference region in each cell.

The "specific unit region" refers to a preset unit composed of more than one slot, more than one tile, or more than one symbol, and in an IEEE 802.16 communication system, more than one tile that has been previously set by a user according to communication environment for data transmission to one MS can be formed as the specific unit region. In addition, the interference regions are divided into the specific unit regions in all frames for the multiple cells, so the specific unit regions have the same sizes and positions in the interference regions having the same sizes and positions, i.e. start positions and end positions of the specific unit regions are equal.

The divided specific unit regions are allocated to MSs located in the interference regions, and one or a plurality of unit regions are allocated to one MS. For convenience, it will be assumed herein that one unit region is allocated to one MS. The specific unit cells can be sequentially allocated according to channel status information between each cell and its MSs, or can be randomly allocated. In addition, the specific unit cells can be allocated according to a preset allocation scheme between cells, or can be allocated according to load information of a BS that manages a neighbor cell. Modulation and Coding Scheme (MCS) level and repetition for each of the specific unit regions are equal in all frames of the multiple cells. That is, the specific unit regions have the same MCS level.

Once IDentifiers (IDs) of the cells in the communication system having a multi-cell structure are determined, BSs that manage the multiple cells divide the frames into non-interference regions 210 and 250 and interference regions 220 and 260, and the interference regions 220 and 260 are defined as described above. Because all frames of the multiple cells have the same structure, all the frames for the multiple cells have one of the structure of FIG. 2A and the structure of FIG. 2B.

Figure 3A:
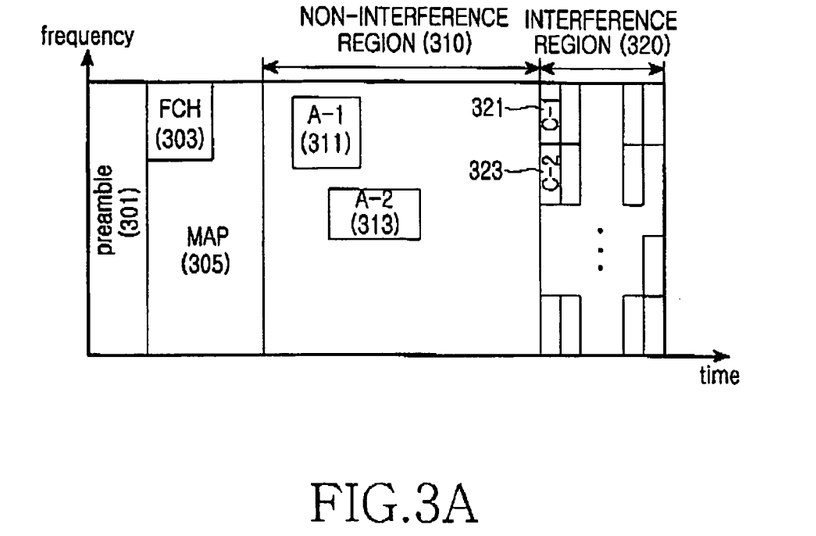
FIGS. 3A and 3B are diagrams illustrating frame structures in a BWA communication system having a multi-cell structure according to the present invention.
Figure 3B:
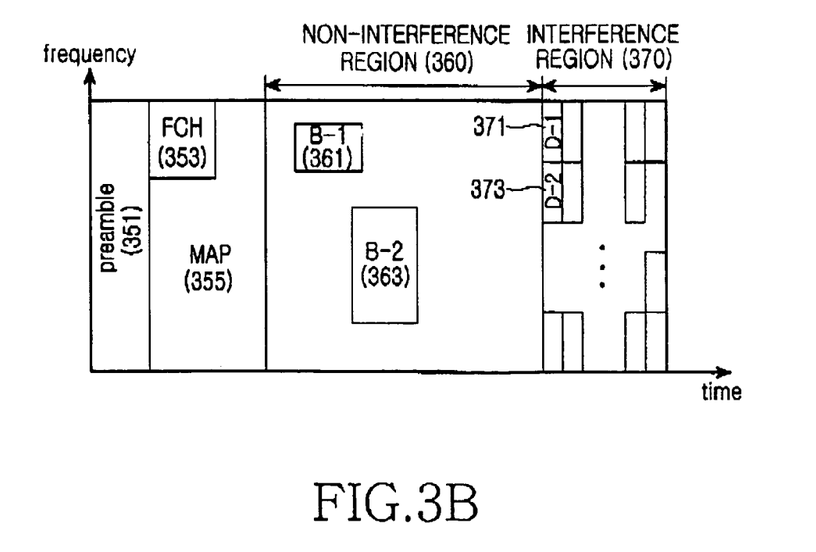

In other words, in all the frames of the multiple cells, the non-interference regions 210 and the interference regions 220 are all divided in the rectangular form and the start positions 201 and the end positions 203 of the interference regions 220 are equal as shown in FIG. 2A, so the interference regions 220 of all the frames are equal in size and position. In addition, in all frames of the multiple cells, non-interference regions 250 and interference regions 260 are divided in a predetermined pattern and the start positions 251 and the end positions 253 of the interference regions 260 are equal as shown in FIG. 2B, so the interference regions 260 of all the frames are equal in size and position. With reference to FIGS. 3A and 3B, a detailed description will now be made of a frame structure in a BWA communication system having a multi-cell structure according to the present invention.

FIGS. 3A and 3B show frame structures in a BWA communication system having a multi-cell structure according to the present invention. Specifically, FIG. 3A shows a frame structure for a serving cell managed by a serving BS that provides a communication service to an MS in the BWA communication system, and FIG. 3B shows a frame structure of a neighbor cell from which the MS receives cell interference. Although data transmission regions of FIGS. 3A and 3B will be assumed to be divided into non-interference regions and interference regions in the rectangular form as shown in FIG. 2A, the data transmission regions of FIGS. 3A and 3B can also be divided according to a predetermined pattern as shown in FIG. 2B.

Referring to FIG. 3A, the frame for a serving cell in the communication system has a two-dimensional structure by a frequency region and a time region, and includes a preamble region 301, a Frame Control Header (FCH) region 303, a MAP message region 305 containing a DL-MAP message and a UL-MAP message, and data transmission regions 310 and 320.

The preamble region 301 is used for transmitting a synchronization signal, i.e. preamble sequence, for synchronization acquisition between a transmitter and a receiver, i.e. between a serving BS and an MS. The FCH region 303 is used for transmitting basic information on sub-channel, ranging, modulation scheme, and the like. The MAP message region 305 is used for transmitting a DL-MAP message and a UL-MAP message.

The MAP message region 305 includes information on the data transmission regions 310 and 320. The data transmission regions 310 and 320 are divided into a non-interference region 310 and an interference region 320. Resources of the non-interference region 310 are allocated to MSs located in the region where they receive no cell interference from a neighbor cell, for example, the center region of the serving cell, and resources of the interference region 320 are allocated to MSs located in the region where they receive cell interference from the neighbor cell, for example, the boundary region of the serving cell.

More specifically, the non-interference region 310 has an A-1 region 311 and an A-2 region 313 allocated to MSs located in the non-interference region, and allocation information of the A-1 region 311 and the A-2 region 313 is included in the MAP message region 305. Similarly, the interference region 320 has a C-1 region 321 and a C-2 region 323 allocated to MSs located in the interference region, and allocation information of the C-1 region 321 and the C-2 region 323 is included in the MAP message region 305.

As information on a start position and an end position of the non-interference region 310 and information on a start position and an end position of the interference region 320, are included in the MAP message region 305 in the time region and the frequency region, position and size information of the non-interference region 310 and the interference region 320 is included in the MAP message region 305. Particularly, in the MAP message region 305, sizes and positions of not only the A-1 region 311 and the A-2 region 313 of the non-interference region 310, but also the C-1 region 321 and the C-2 region 323 of the interference region 320, are expressed in the time region and the frequency region using the start positions and the end positions. For the allocation information included in the MAP message region 305, the allocated regions, which are a multiple of a slot, are expressed with their positions and sizes. The slot indicates the minimum resource allocation unit composed of sub-channels and symbols in the time region and the frequency region.

Not only the A-1 region 311 and the A-2 region 313 of the non-interference region 310 but also the C-1 region 321 and the C-2 region 323 of the interference region 320 are allocated to MSs located in the non-interference region of the serving cell and MSs located in the interference region of the serving cell. That is, the A-1 region 311 is allocated to one MS located in the non-interference region, and the A-2 region 313 is allocated to another MS located in the non-interference region. Similarly, the C-1 region 321 is allocated to one MS located in the interference region, and the C-2 region 323 is allocated to another MS located in the interference region.

Therefore, if the MSs located in the serving cell detect, after receiving the MAP message, MAP information allocated to them while sequentially decoding the MAP information included in the received MAP message, they can determine positions of resources allocated to them using position information in the detected MAP information.

Referring to FIG. 3B, the frame for a neighbor cell of the communication system has the same structure as the frame for the serving cell of FIG. 3A. That is, the frame for the neighbor cell has a two-dimensional structure by a frequency region and a time region, and includes a preamble region 351, an FCH region 353, a MAP message region 355 containing a DL-MAP message and a UL-MAP message, and data transmission regions 360 and 370.

The preamble region 351 is used for transmitting a synchronization signal, i.e. preamble sequence, for synchronization acquisition between a transmitter and a receiver, i.e. between a neighbor BS and an MS. The FCH region 353 is used for transmitting basic information on sub-channel, ranging, modulation scheme, and the like. The MAP message region 355 is used for transmitting a DL-MAP message and a UL-MAP message.

The MAP message region 355 includes information on the data transmission regions 360 and 370. The data transmission regions 360 and 370 are divided into a non-interference region 360 and an interference region 370. Resources of the non-interference region 360 are allocated to MSs located in the region where they receive no cell interference from another neighbor cell, for example, the center region of the neighbor cell, and resources of the interference region 370 are allocated to MSs located in the region where they receive cell interference from another neighbor cell, for example, the boundary region of the neighbor cell.

More specifically, the non-interference region 360 has a B-1 region 361 and a B-2 region 363 allocated to MSs located in the non-interference region, and allocation information of the B-1 region 361 and the B-2 region 363 is included in the MAP message region 355. Similarly, the interference region 370 has a D-1 region 371 and a D-2 region 373 allocated to MSs located in the interference region, and allocation information of the D-1 region 371 and the D-2 region 373 is included in the MAP message region 355.

As information on a start position and an end position of the non-interference region 360 and information on a start position and an end position of the interference region 370 are included in the MAP message region 355 in the time region and the frequency region, position and size information of the non-interference region 360 and the interference region 370 is included in the MAP message region 355. Particularly, in the MAP message region 355, sizes and positions of not only the B-1 region 361 and the B-2 region 363 of the non-interference region 360, but also the D-1 region 371 and the D-2 region 373 of the interference region 370, are expressed in the time region and the frequency region using the start positions and the end positions. For the allocation information included in the MAP message region 355, the allocated regions, which are a multiple of a slot, are expressed with their positions and sizes.

Not only the B-1 region 361 and the B-2 region 363 of the non-interference region 360 but also the D-1 region 371 and the D-2 region 373 of the interference region 370 are allocated to MSs located in the non-interference region of the neighbor cell and MSs located in the interference region of the neighbor cell. That is, the B-1 region 361 is allocated to one MS located in the non-interference region, and the B-2 region 363 is allocated to another MS located in the non-interference region. Similarly, the D-1 region 371 is allocated to one MS located in the interference region, and the D-2 region 373 is allocated to another MS located in the interference region.

Therefore, if the MSs located in the neighbor cell detect, after receiving the MAP message, MAP information allocated to them while sequentially decoding the MAP information included in the received MAP message, they can determine positions of resources allocated to them using position information in the detected MAP information.

In the frames for the serving cell and the neighbor cell, the interference regions 320 and 370 are divided as the same regions as described above. That is, the interference regions 320 and 370 of the serving cell frame and the neighbor cell frame have the same sizes and positions. More specifically, the interference regions 320 and 370 are defined by start positions and end positions of the regions of the frames, and in the frames, the start positions and the end positions of the interference regions 320 and 370 are equal. In addition, the interference regions 320 and 370 are composed of specific unit regions for resource allocation to MSs located in an interference region of the cell, for example, to MSs which are located in the cell boundary and receive cell interference from a neighbor cell, and the specific unit region is allocated to one MS located in an interference region in each cell. Further, MCS level and repetition for each of the specific unit regions are equal in both of the serving cell frame and the neighbor cell frame.

Therefore, when an MS located in the boundary region of the serving cell, i.e. in the interference region, is allocated the C-1 region 321 of the interference region 320 from the serving cell frame and receives data from the serving BS, the MS may receive cell interference from the neighbor cell. That is, the MS, as it is located in the interference region of the interference cell, may receive cell interference from the neighbor BS that transmits data through the D-1 region 371 of the interference region 370 in the neighbor cell frame. At this point, the MS located in the interference region of the serving cell can detect information included in the preamble region 351 of the neighbor cell frame, and obtain information on resource allocation regions of a cell interference signal from the neighbor cell, i.e. a start position and an end position of the D-1 region 371, and information on permutation, scrambling, MCS level and repetition of the interference signal transmitted through the D-1 region 371, using the detected information.

That is, because the interference region 320 in the serving cell frame is equal to the interference region 370 in the neighbor cell frame as described above, an MS that is located in the interference region of the serving cell and receives data through the C-1 region 321 in the interference region 320 of the serving cell frame can obtain all information on the signal giving cell interference by the D-1 region 371 in the interference region 370 of the neighbor cell frame by detecting only the information included in the preamble region 351 of the neighbor cell frame. Therefore, the MS can simply remove cell interference received from the neighbor cell without detecting the MAP information included in the MAP message region 355 of the neighbor cell frame.

Figure 4:
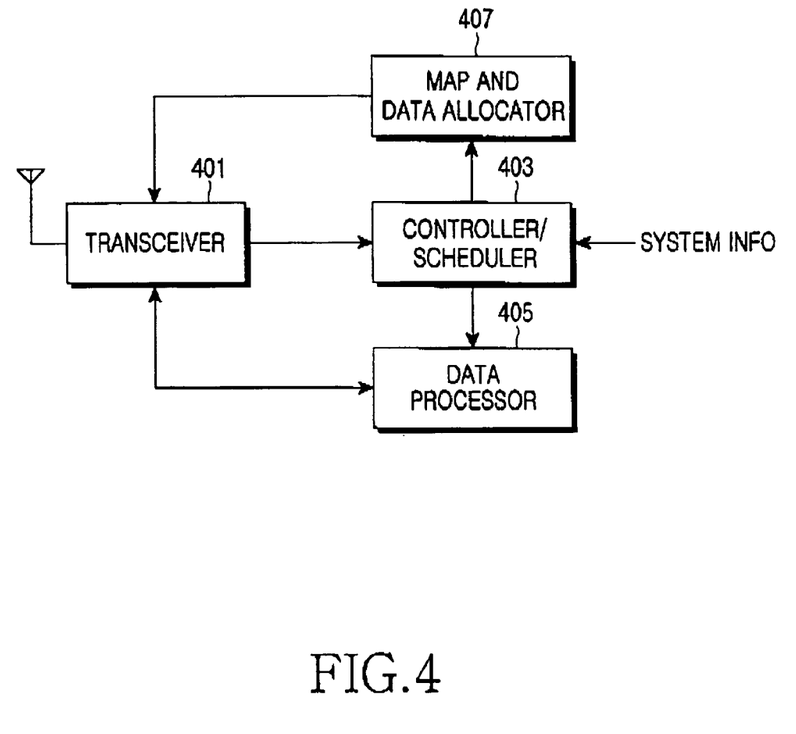
FIG. 4 is a diagram illustrating a structure of a BS in a BWA communication system having a multi-cell structure according to the present invention.

FIG. 4 shows a BS in a BWA communication system having a multi-cell structure according to the present invention. Referring to FIG. 4, the BS includes a transceiver 401 for exchanging data with MSs located in the BS cell, a data processor 405 for processing the data, a controller/scheduler 403 for controlling the overall operation of the BS depending on system information, and MS information and channel information received via the transceiver 401, and allocating resources to the MSs, and a MAP and data allocator 407 for allocating MAP information of the MSs and the data to be transmitted to the MSs according to the control and allocation information from the controller/scheduler 403.

Figure 5:
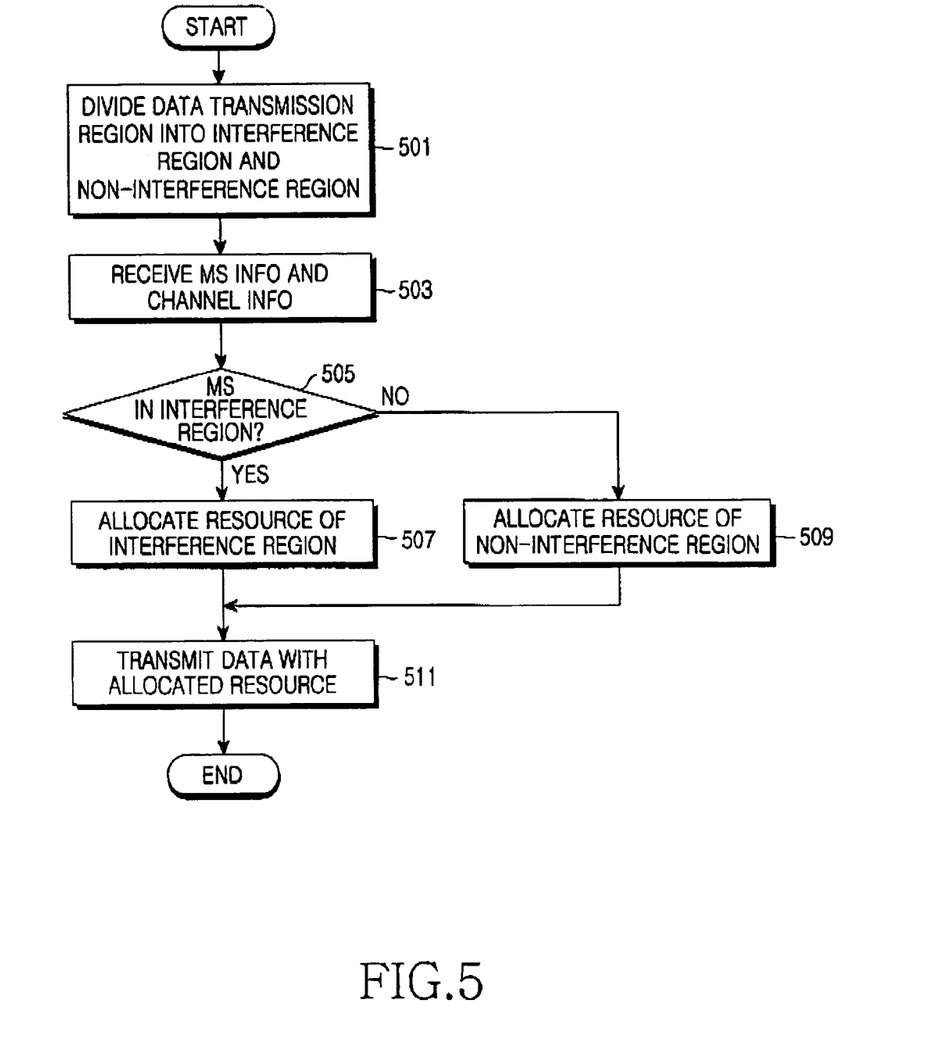
FIG. 5 is a flowchart illustrating an operation of a BS in a BWA communication system having a multi-cell structure according to the present invention.

The MAP and data allocator 407, once an ID of a cell managed by the BS is determined, divides a frame of the cell into regions, and particularly divides a data transmission region into a non-interference region and an interference region. In addition, the MAP and data allocator 407 allocates corresponding resources to the MSs according to the control and allocation information from the controller/scheduler 403, and includes the allocated resource information in MAP information. With reference to FIG. 5, a detailed description will now be made of an operation of the BS according to the present invention.

FIG. 5 shows an operation of a BS in a BWA communication system having a multi-cell structure according to the present invention. Referring to FIG. 5, in step 501, the BS, once an ID of the BS cell is determined, divides a data transmission region for transmitting data to MSs located in the BS cell into a non-interference region and an interference region. That is, in step 501, the BS divides resources available for data transmission to MSs into resources to be allocated to MSs located in a non-interference region and resources to be allocated to MSs located in an interference region. Thereafter, in step 503, the BS receives feedback information, i.e. MS information and channel information, from the MSs located in the cell. In step 505, the BS determines from the received feedback information whether a corresponding MS is located in the interference region.

If it is determined in step 505 that the corresponding MS is located in the interference region, in other words, if the MS is located in the cell boundary and receives cell interference from a neighbor cell, the BS proceeds to step 507 where it allocates resources of the interference region. On the contrary, if it is determined in step 505 that the corresponding MS is located in the non-interference region, in other words, if the MS is located in the center region of the cell and receives no cell interference from the neighbor cell, the BS proceeds to step 509 where it allocates resources of the non-interference region. Thereafter, in step 511, the BS includes division information of the data transmission region, i.e. size and position information of the interference region and non-interference region, and resource allocation information in a MAP message, transmits the MAP message to the MS, and transmits data to the MS with the allocated resource.

Figure 6:
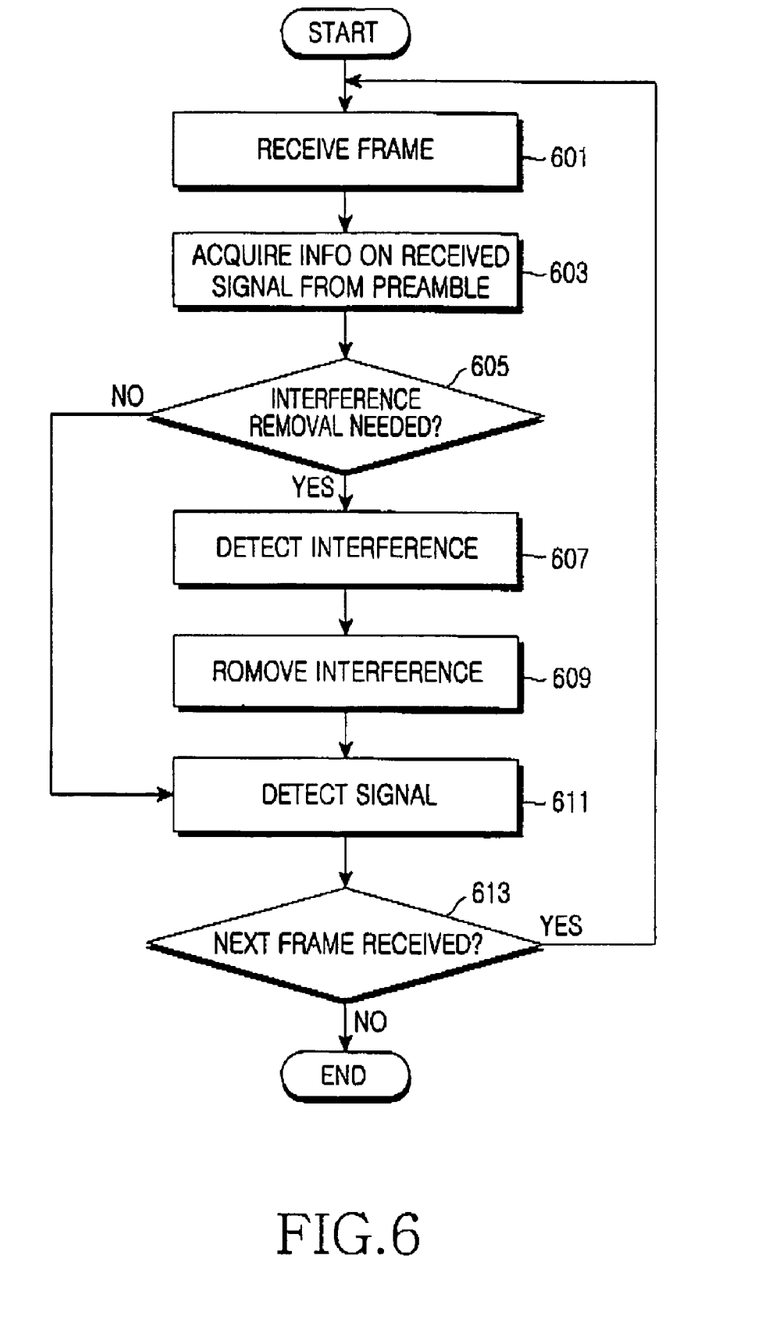
FIG. 6 is a flowchart illustrating a data reception operation of an MS in a BWA communication system having a multi-cell structure according to the present invention.

FIG. 6 shows a data reception operation of an MS in a BWA communication system having a multi-cell structure according to the present invention. Referring to FIG. 6, in step 601, the MS receives a frame in which a data transmission region is divided into a non-interference region and an interference region. In step 603, the MS acquires permutation, scrambling, MCS level and repetition information of a received signal through a preamble region of the frame. The received signal includes not only the signal received from a serving BS that manages a cell in which the MS is currently located, but also the signal received from a neighbor BS that manages a cell adjacent to the serving cell, i.e. a cell interference signal. Because the interference region of the serving cell frame and the interference region of the neighbor cell frame are divided in the same way as described above, the MS acquires permutation, scrambling, MCS level and repetition information of the interference signal, and position and size information of the interference region of the neighbor cell frame through the preamble region of the serving cell frame.

Thereafter, in step 605, the MS determines whether there is any interference signal received from the neighbor BS in the received signal, i.e. whether it should remove the interference signal, if any. If it is determined in step 605 that there is an interference signal, the MS proceeds to step 607 where it detects an interference signal received from the neighbor BS. Thereafter, in step 609, the MS removes the detected interference signal. In step 611, the MS detects a signal received from the serving BS, and receives the data that the serving BS transmits to the MS itself.

However, if it is determined in step 605 that there is no interference signal, the MS proceeds to step 611 where it detects a signal received from the serving BS and receives the data that the serving BS transmits to the MS itself. Thereafter, in step 613, the MS determines whether the next frame is received, i.e. whether there is more data transmitted from the serving BS. If it is determined that the next frame is received, the MS returns to step 601. However, if no frame is received, the MS ends the data reception operation.

As can be understood from the foregoing description, the communication system according to the present invention divides a data transmission region into an interference region and a non-interference region, so an MS receiving cell interference from the neighbor cell can increase a received CINR by simply removing the cell interference, thereby reducing the system load and thus improving system performance.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for allocating resource in a communication system, the method comprising: dividing a data transmission region into a first region and a second region; allocating resource of the first region when a first Mobile Station (MS) among MSs is an MS located in a non-interference region; and allocating resource of the second region when a second MS among the MSs is an MS located in an interference region, wherein the second region has a same position in frames transmitted from a plurality of cells.

2. The method of claim 1, wherein the division of a data transmission region into a first region and a second region comprises dividing the data transmission region into the first region and the second region when an IDentifier (ID) of a cell in which the MSs are located is determined.

3. The method of claim 1, wherein the division of a data transmission region into a first region and a second region comprises dividing the data transmission region so a second region divided from a data transmission region of a serving cell where the MSs are located, and a second region divided from a data transmission region of a cell adjacent to the serving cell have the same size and position.

4. The method of claim 3, wherein the division into the same size and position comprises dividing the second region divided from the data transmission region of the serving cell and the second region divided from the data transmission region of the neighbor cell into a plurality of unit regions having the same size and position.

5. The method of claim 4, wherein the plurality of unit regions have a same Modulation and Coding Scheme (MCS) level.

6. The method of claim 1, wherein the division of a data transmission region into a first region and a second region comprises including size and position information of the first region and size and position information of the second region in a MAP message region.

7. The method of claim 6, wherein the size and position information comprises start positions and end positions of the first region and the second region.

8. The method of claim 1, wherein the division of resource comprises including size and position information of the allocated resource region in a MAP message region.

9. The method of claim 8, wherein the size and position information comprises a start position and an end position of the allocated resource region.

10. The method of claim 1, wherein the allocation resource of the second region comprises dividing the second region into a plurality of unit regions, and allocating specific unit regions among the plurality of divided unit regions to the second MS.

11. A system for allocating resource in a communication system, the system comprising: a Base Station (BS) for dividing a data transmission region into a first region and a second region, allocating resource of the first region when a first Mobile Station (MS) among MSs is an MS located in a non-interference region, and allocating resource of the second region when a second MS among the MSs is an MS located in an interference region; and an MS for analyzing information included in a MAP message region of the received frame upon receiving a frame from the BS, determining a region where the MS is currently located in a serving cell according to the analyzed information, and determining a region where resource is allocated in the received frame according to the determined region where the MS is located, wherein the second region has a same position in frames transmitted from a plurality of cells.

12. The system of claim 11, wherein the BS divides the data transmission region into the first region and the second region when an IDentifier (ID) of the BS cell is determined.

13. The system of claim 11, wherein the BS divides the data transmission region so a second region divided from a data transmission region of the BS serving cell, and a second region divided from a data transmission region of a cell adjacent to the serving cell have the same size and position.

14. The system of claim 13, wherein the BS divides the second region divided from the data transmission region of the serving cell and the second region divided from the data transmission region of the neighbor cell into a plurality of unit regions having the same size and position.

15. The system of claim 14, wherein the plurality of unit regions have a same Modulation and Coding Scheme (MCS) level.

16. The system of claim 11, wherein the BS includes size and position information of the first region and size and position information of the second region in a MAP message region.

17. The system of claim 16, wherein the size and position information comprises start positions and end positions of the first region and the second region.

18. The system of claim 11, wherein the BS includes size and position information of the allocated resource region in a MAP message region.

19. The system of claim 18, wherein the size and position information comprises a start position and an end position of the allocated resource region.

20. The system of claim 11, wherein the BS divides the second region into a plurality of unit regions, and allocates specific unit regions among the plurality of divided unit regions to the second MS.

21. The system of claim 11, wherein the MS determines resource allocated in a first region of a data transmission region in the received frame when the MS is currently located in a non-interference region in the serving cell, and determines resource allocated in a second region of the data transmission region in the received frame when the MS is currently located in an interference region in the serving cell.

* * * * *